(12) United States Patent
Jensen et al.

(10) Patent No.: US 7,471,737 B2
(45) Date of Patent: *Dec. 30, 2008

(54) HARDWARE EFFICIENT FSK DEMODULATOR

(75) Inventors: Henrik T. Jensen, Long Beach, CA (US); Paul Anthony Lettieri, Lake Forest, CA (US)

(73) Assignee: Broadcom Corporation, Irvine, CA (US)

( * ) Notice: Subject to any disclaimer, the term of this patent is extended or adjusted under 35 U.S.C. 154(b) by 804 days.

This patent is subject to a terminal disclaimer.

(21) Appl. No.: 11/015,162

(22) Filed: Dec. 17, 2004

(65) Prior Publication Data

US 2006/0133532 A1 Jun. 22, 2006

(51) Int. Cl.
*H03C 3/00* (2006.01)
*H04L 25/03* (2006.01)
(52) U.S. Cl. ................................ 375/296; 375/292
(58) Field of Classification Search ................ 375/295, 375/296, 302, 303, 308
See application file for complete search history.

(56) References Cited

U.S. PATENT DOCUMENTS

| 7,035,595 | B1 * | 4/2006 | Kim et al. ................... 455/73 |
| 7,072,626 | B2 * | 7/2006 | Hadjichristos ............. 455/126 |
| 2006/0104383 | A1 * | 5/2006 | Jensen ........................ 375/295 |
| 2006/0119493 | A1 * | 6/2006 | Tal et al. ..................... 341/143 |

* cited by examiner

*Primary Examiner*—David B Lugo
(74) *Attorney, Agent, or Firm*—Garlick Harrison & Markison; James A. Harrison (57) ABSTRACT

A radio frequency (RF) transmitter includes a digital radio processor and a baseband processor. A complex analog-to-digital converter (ADC) within the radio processor provides an analog interface to the baseband processor to receive an analog complex modulated baseband signal and convert the analog complex modulated baseband signal to a digital complex modulated baseband signal. A demodulator within the radio processor demodulates the digital complex modulated baseband signal to recreate the original transmit digital data as a demodulated digital signal. The demodulated digital signal is processed by a digital processor in the radio processor to mitigate the effects of various imperfections in the radio processor circuitry.

19 Claims, 10 Drawing Sheets

HARDWARE EFFICIENT FSK DEMODULATOR

BACKGROUND

1. Technical Field

The present invention relates to wireless communications and, more particularly, FSK demodulators for wireless communication systems.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data modulation stage is implemented on a baseband processor chip, while the intermediate frequency (IF) stages and power amplifier stage are implemented on a separate radio processor chip. Historically, radio integrated circuits have been designed using bi-polar circuitry, allowing for large signal swings and linear transmitter component behavior. Therefore, many legacy baseband processors employ analog interfaces that communicate analog signals to and from the radio processor.

However, with the emergence of low-power, low-voltage CMOS radio processors, imperfections in the CMOS analog transmitter circuitry have required the addition of one or more digital signal pre-processing stages to mitigate the effects of such analog imperfections. The digital signal processing required is usually specific to the particular analog radio transmitter architecture, and therefore, is best implemented as part of the radio processor chip. Since the analog signals output from the baseband processor, which typically include modulated in-phase and quadrature phase components at zero IF, are not well suited for interfacing with a digital processing stage, the optimal baseband processor interface to a CMOS radio processor with substantial digital processing is an all-digital interface. However, until next-generation baseband processors are designed with digital interfaces to the radio processor, digital CMOS radio processors must be able to accommodate analog interfaces.

Thus, a need exists for a digital radio processor architecture capable of accommodating analog baseband interfaces. Moreover, a need exists for efficient demodulators that accommodate analog baseband interfaces.

SUMMERY OF INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
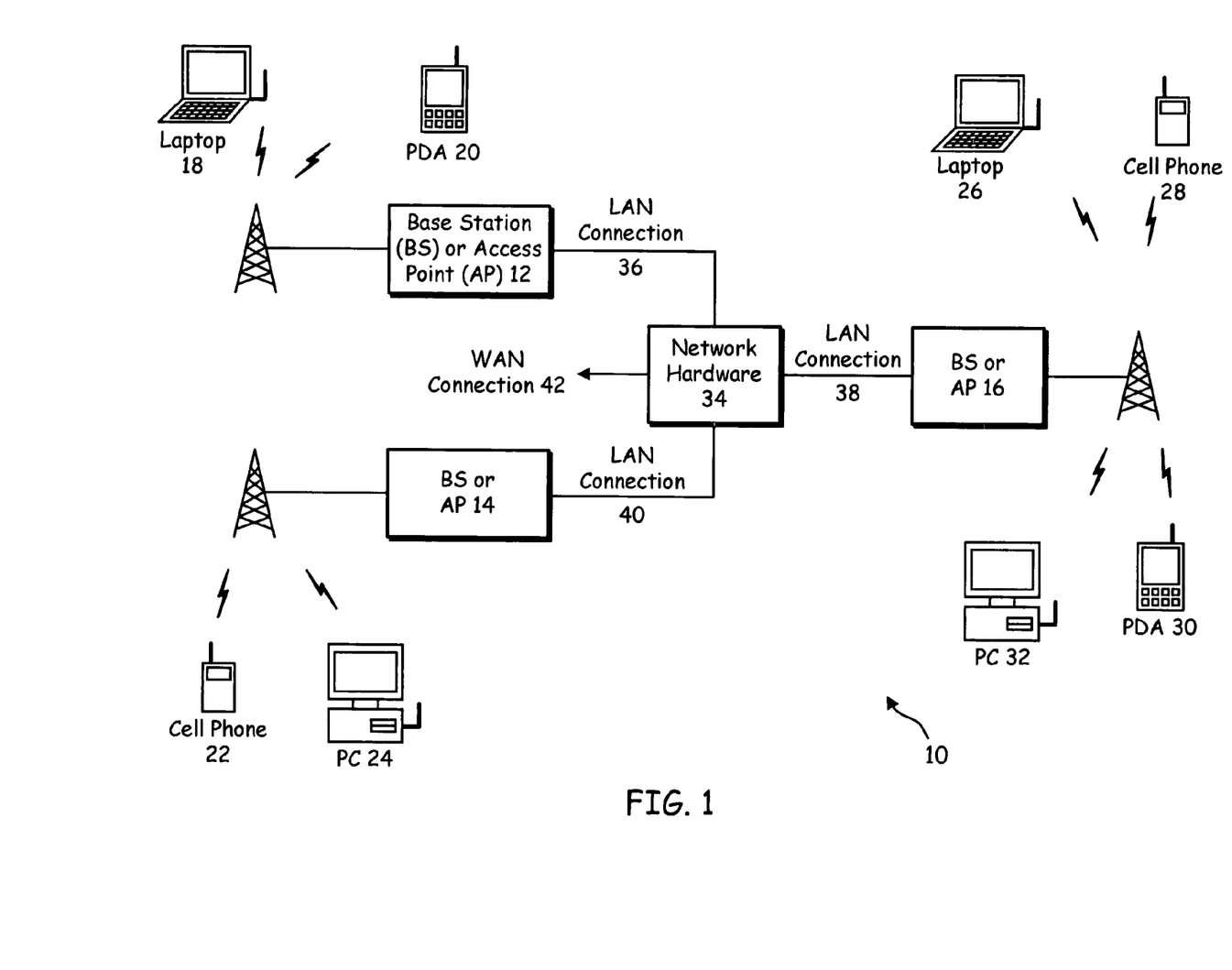
FIG. 1 is a functional block diagram illustrating a communication system that includes a plurality of base stations or access points (APs), a plurality of wireless communication devices and a network hardware component.

FIG. 1 is a functional block diagram illustrating a communication system 10 that includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to the following figures.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
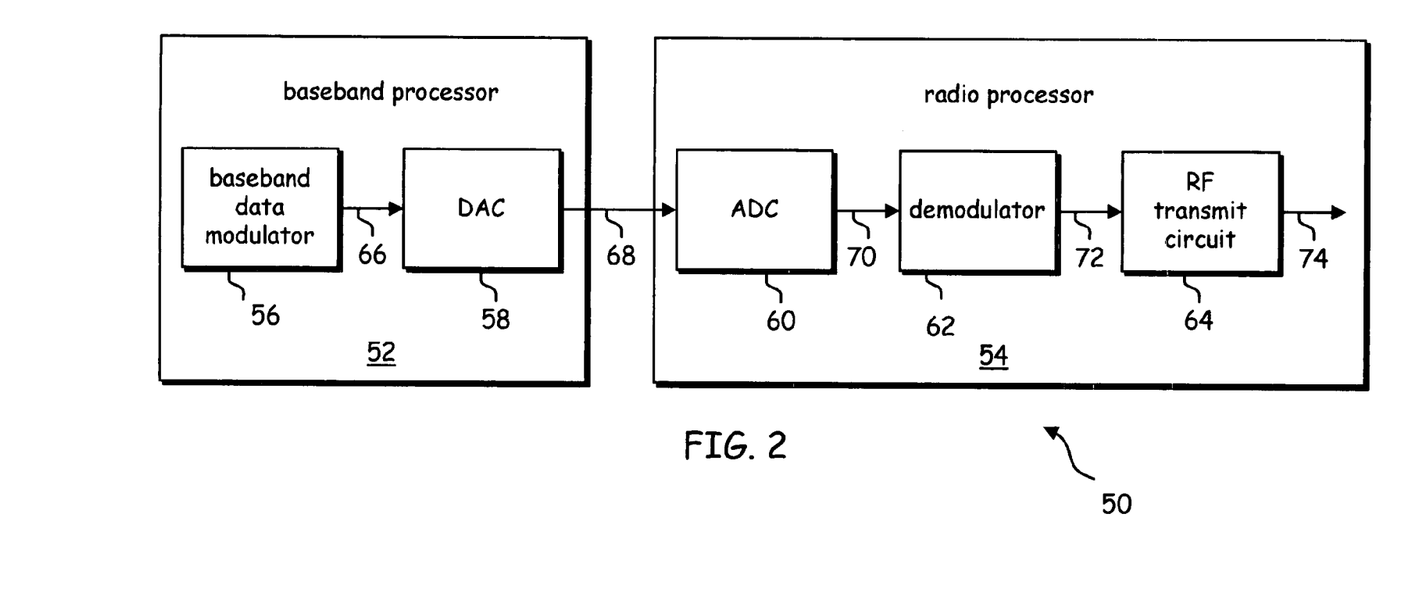
FIG. 2 illustrates a high-level architecture for a radio frequency (RF) transmitter including a baseband processor and a radio processor.

FIG. 2 illustrates a high-level architecture for a radio frequency (RF) transmitter 50 including a baseband processor 52 and a radio processor 54. The baseband processor 52 and radio processor 54, in combination, provide various functions, including, but not limited to, scrambling, encoding, constellation mapping and modulation. The baseband processor 52 and radio processor 54 may be implemented using individual processing devices, or a plurality of processing devices. Such processing devices may include microprocessors, micro-controllers, digital signal processors, field programmable gate arrays, programmable logic devices, state machine, logic circuitry, analog circuitry, digital circuitry, and/or any device that manipulates signals (analog and/or digital) based on operational instructions. In addition, the RF transmitter 50 may be implemented using one or more integrated circuits. For example, the baseband processor 52 may be implemented on a first integrated circuit (chip), while the radio processor 54 may be implemented on a second integrated circuit.

As shown in FIG. 2, at a high level, the baseband processor 52 includes a baseband data modulator 56 and a digital-to-analog converter (DAC) 58, and the radio processor 54 includes an analog-to-digital converter 60, a demodulator 62 and RF transmit circuit 64. In operation, the baseband data modulator 56 of the baseband processor 52 receives outgoing transmit data and processes the outgoing data in accordance with a particular wireless communication standard (e.g., IEEE 802.11a, IEEE 802.11b, Bluetooth, etc.) to produce a digital modulated baseband signal 66. In the described example, digital modulated baseband signal 66 is FSK modulated. The digital-to-analog converter 58 converts the digital modulated baseband signal 66 from digital to an analog modulated baseband signal 68.

The analog-to-digital converter 60 of the radio processor 54 receives the analog modulated baseband signal 68 and converts the analog modulated baseband signal 68 from analog to a digital signal 70 to substantially reproduce the digital modulated baseband signal 66. The demodulator 62 demodulates the digital signal 70 in accordance with the particular wireless communication standard being implemented by the RF transmitter 50 to produce a demodulated digital signal 72 representing the original outgoing transmit data. The RF transmit circuit 64 processes the demodulated digital signal 72 to mitigate the effects of imperfections in the RF circuit, re-modulates the processed signal in accordance with the particular wireless communication standard and converts the re-modulated signal from the digital domain to the analog domain to produce an RF signal 74.

Figure 3:
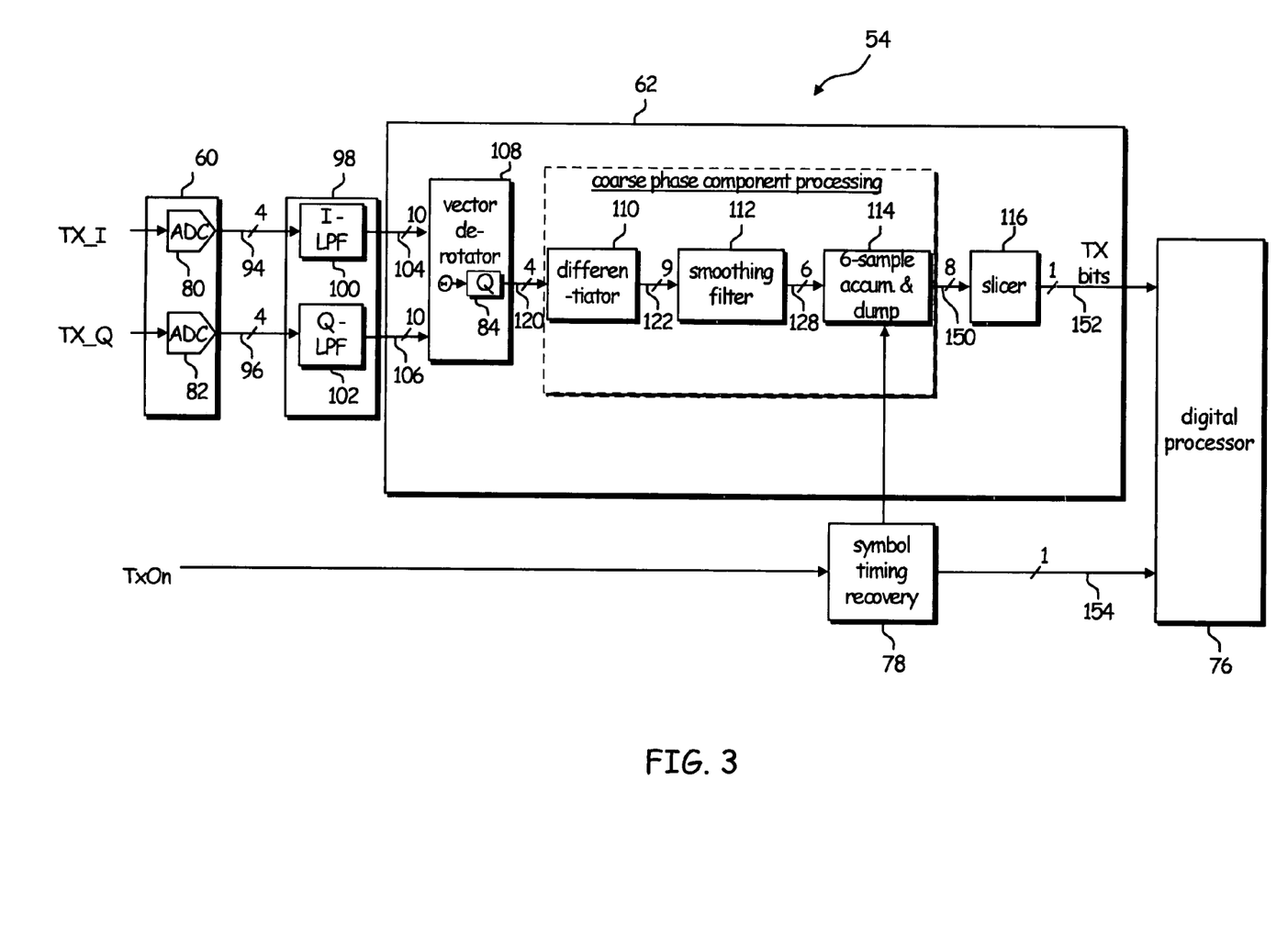
FIG. 3 is a circuit schematic illustrating various components of a radio processor according to one embodiment of the present invention.

FIG. 3 is a circuit schematic diagram illustrating various components of the radio processor 54 according to one embodiment of the present invention. The radio processor 54 includes a complex analog-to-digital converter 60, a demodulator 62, a digital processor 76 and a timing recovery circuit 78. The complex analog-to-digital converter (ADC) 60 is connected to receive an analog complex modulated baseband signal from the baseband processor. The analog complex modulated baseband signal includes analog in-phase and quadrature phase signals, labeled Tx_I and Tx_Q, respectively. The analog in-phase signal Tx_I is received at a first ADC 80 of the complex ADC 60 and the quadrature phase signal Tx_Q is received at a second ADC 82 of the complex ADC 60. The first ADC 80 converts the analog in-phase signal Tx_I from the analog domain to the digital domain to produce a digital in-phase signal. The second ADC 82 converts the analog quadrature phase signal Tx_Q from the analog domain to the digital domain to produce a digital quadrature phase signal.

Figure 4:
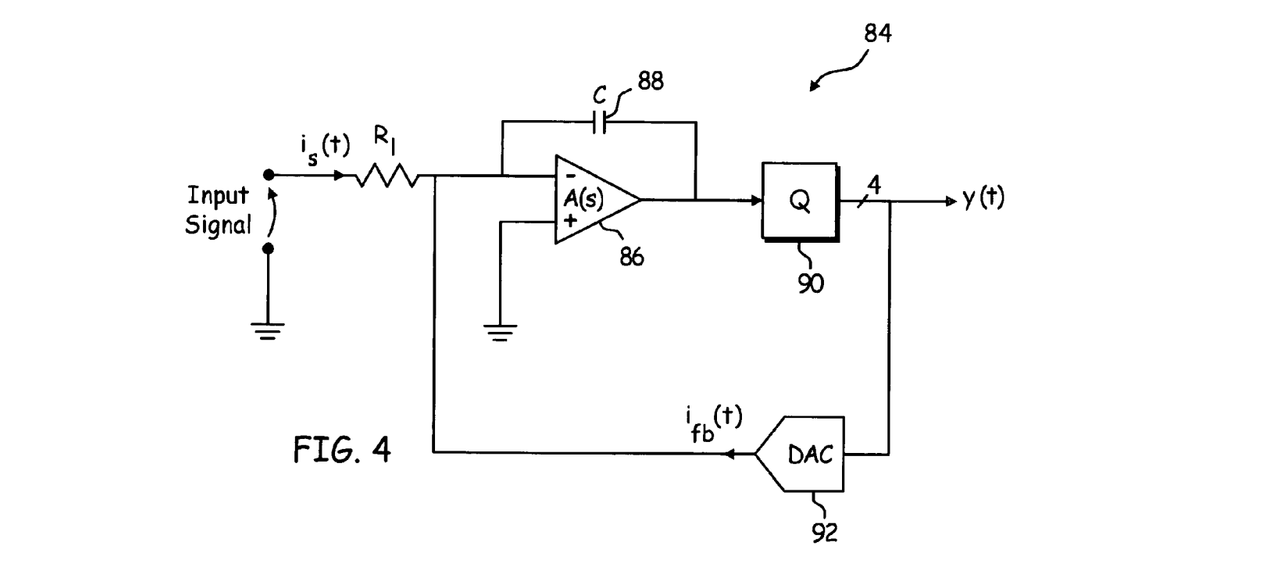
FIG. 4 illustrates an exemplary delta-sigma that provides a high signal-to-noise ratio (SNR) over a limited bandwidth corresponding to the dominant bandwidth of the analog complex modulated baseband signal.

An example of an ADC for converting the analog in-phase or quadrature phase signal from the analog domain to the digital domain is shown in FIG. 4. FIG. 4 illustrates an exemplary delta-sigma ADC 84 that provides a high signal-to-noise ratio (SNR) over a limited bandwidth corresponding to the dominant bandwidth of the analog complex modulated baseband signal. An operational amplifier (op-amp) 86 with negative feedback constitutes an integrator formed by the op-amp 86 and a capacitor 88 in the feedback loop. The integrator integrates the input current, labeled $i_s(t)$, flowing from an input signal to produce an analog integrator output voltage. A coarse (in this example 4-bit) quantizer 90 converts the analog integrator output voltage signal to a digital format, shown as y(t). The quantizer 90 includes an array of comparators, essentially 1-bit ADCs, whose output is either "high" or "low" depending upon the magnitude of the integrator voltage relative to a reference signal generated by a reference generator. A digital-to-analog converter (DAC) 92 provides a feedback current responsive to a logic value ("1" or "0") of the ADC output from the quantizer 90.

Figure 5:
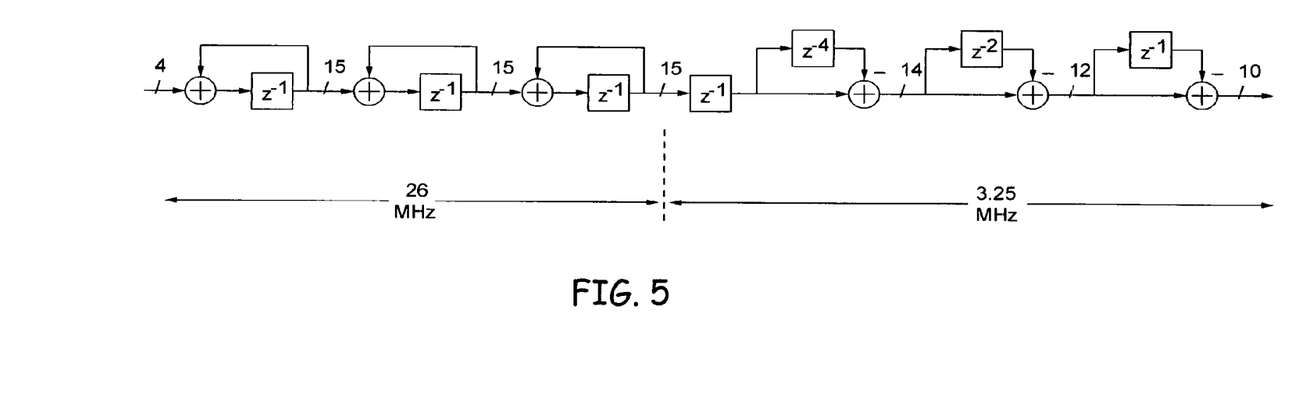
FIG. 5 is a functional schematic diagram of a digital low pass filter that is appropriate for use as low pass filter.

Referring again to FIG. 3, once the complex ADC 60 has converted the analog complex modulated baseband signal to a digital complex modulated baseband signal, the digital complex modulated baseband signal, made up of the digital in-phase and quadrature phase signals 94 and 96, respectively, is input to a low pass filter block 98 which further comprises low pass filter 100 for digitally filtering an in-phase component and a low pass filter 102 for digitally filtering a quadrature component of a complex digital baseband signal. In the described embodiment, the output of low pass filters 100 and 102 are 10-bit wide low pass digital filtered signals 104 and 106, respectively, that are produced to the demodulator 62 to demodulate the digital complex modulated baseband signal. FIG. 5 is a functional schematic diagram of a digital low pass filter that is appropriate for use as low pass filter 100 or 102. One of average skill in the art may readily construct such a filter and comprehend its operation without further discussion here.

The demodulator 62 includes a vector de-rotator 108, a differentiator 110, a smoothing filter 112, an accumulate-and-dump circuit 114, and a slicer 116. Vector de-rotator 108 is also referenced herein a coordinate rotation digital computer (CORDIC).

The complex low pass filter block 98 includes an in-phase low pass filter (I-LPF) 100 and a quadrature phase low pass filter (Q-LPF) 102. The I-LPF 100 is connected to receive the digital in-phase signal 94 and is operable to filter the digital in-phase signal to produce a first digital filtered signal 104. The Q-LPF 102 is connected to receive the digital quadrature phase signal 96 and is operable to filter the digital quadrature phase signal to produce a second digital filtered signal 106. In one embodiment, the complex low pass filter block 98 is a decimation filter that both performs low pass filtering and lowers the digital sampling rate. For example, the decimation filter may lower the sampling rate from 26 MHz (the sampling rate of the input of the demodulator) to 3.25 MHz (the sampling rate of the output of the demodulator).

The first and second digital filtered signals 104 and 106, respectively, are input to the vector de-rotator 108 to de-rotate the I and Q vector digital data. For example, in one embodiment, the vector de-rotator 108 may be a CORDIC that de-rotates the complex input vector back down to the real axis to produce a digitized baseband signal represented by an angle and magnitude of the complex input vector. Because an application of the embodiment of the present invention is for an FSK demodulator, only a phase component is extracted. Thus, an extracted phase component which is ten bits wide is produced to delta-sigma quantizer 84 that produces a four bit wide quantized output 120.

Figure 6:
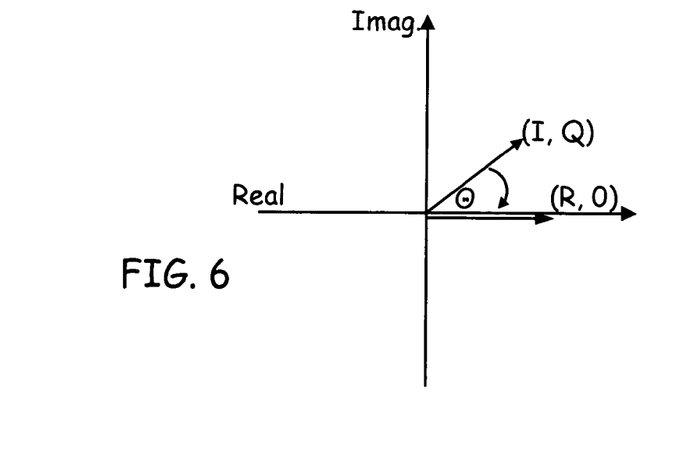
FIG. 6 is a graph illustrating an exemplary output of a CORDIC.

FIG. 6 is a graph illustrating an exemplary output of a CORDIC. The output angle is normalized to the range [−π; +π]. In one embodiment implementing a frequency shift keying (FSK) demodulator, the CORDIC calculates the angle of the complex input vector to 10-bit precision. In the described embodiment, a phase value only is extracted from the CORDIC (vector de-rotator 108) for further processing.

Figure 7:
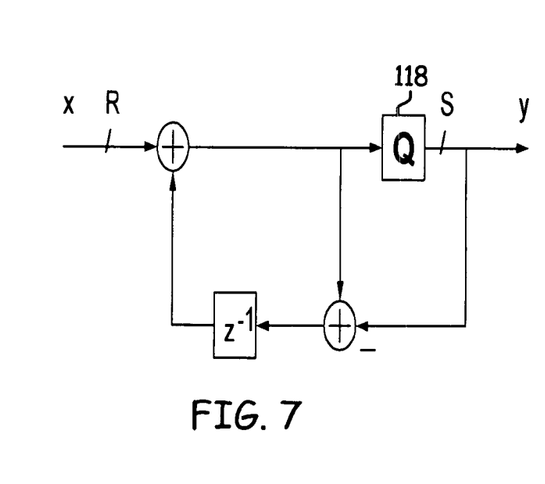
FIG. 7 is a functional schematic block diagram of a quantization node formed according to one embodiment of the invention.
Figure 8:
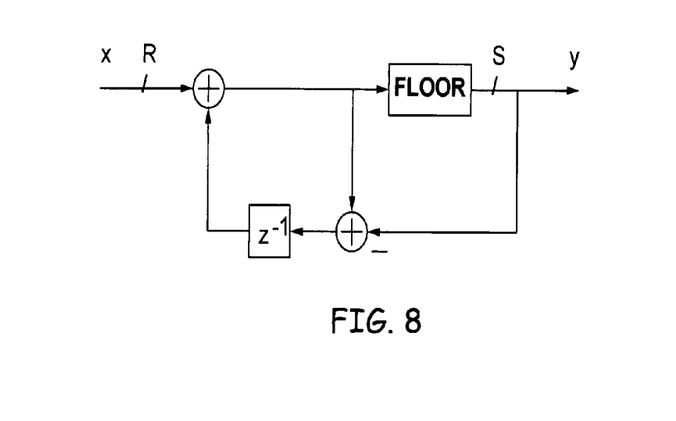
FIG. 8 is a functional block diagram of a quantization node with a flooring quantizer.

FIG. 7 is a functional schematic block diagram of a quantization node formed according to one embodiment of the invention. As shown in FIG. 7, the quantization node of the present invention includes two adders, a register, and a quantizer labeled Q. In the described embodiment, CORDIC 108 includes a quantization node 118 that is operable to coarsely quantify and produce a four bit phase value 120 based upon a a precise 10 bit wide phase value produced by the CORDIC 108. FIG. 8 is a functional block diagram of a quantization node with a flooring quantizer. The quantizer may be a rounding quantizer or a flooring quantizer, as defined in the above, but is shown in the described embodiment as a flooring quantizer.

Figure 9:
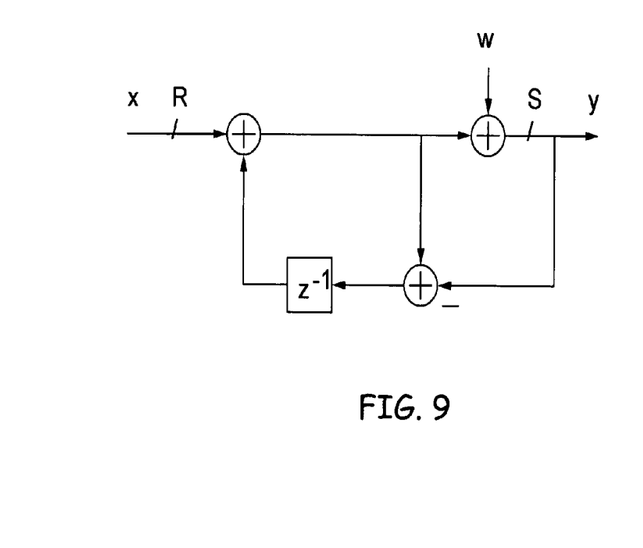
FIGS. 9-12 are functional schematic block diagrams of a quantization node to illustrate operation thereof.

To analyze the signal processing properties of the proposed quantization node, consider the signal processing equivalent of FIG. 8 shown in FIG. 9. In FIG. 9, the quantizer has been replaced by an additive noise source, here labeled w, where $$w[n]=x[n]-y[n].$$

FIG. 9 is an exact equivalent of FIG. 8 since it is always possible to define a sequence w such that the processing blocks of FIG. 8 and FIG. 9 produce identical outputs for the same input.

Figure 10:
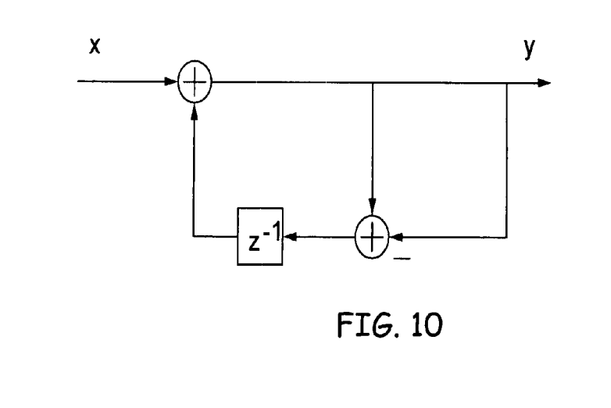

To perform a linear systems analysis, consider first FIG. 10, where the transfer function between input and output is desired. The feedback path is effectively eliminated, and thus the desired transfer function is $$H(z) \equiv \frac{Y(z)}{X(z)} = 1.$$

Figure 11:
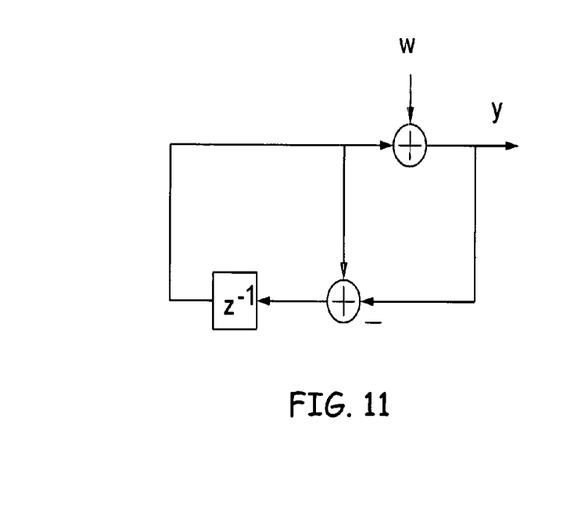
Figure 12:
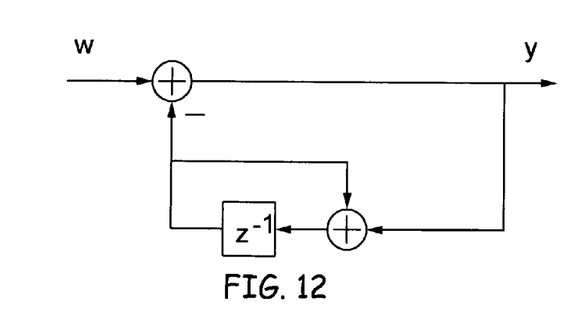

Next, consider FIG. 11, where the input signal has been eliminated to derive the transfer function between the quantization noise source w and the output. The system of FIG. 11 may be re-arranged, as in FIG. 12, and it follows that $$N(z) \equiv \frac{Y(z)}{W(z)} = \frac{1}{1-\left(-\frac{z^{-1}}{1-z^{-1}}\right)} = (1-z^{-1}).$$

Notice that the above derived transfer functions are identical to the signal transfer function and the quantization noise transfer function, respectively, of the well-known first order delta sigma modulator (ΔΣ modulator).

The quantization noise source w of the quantization node employing a rounding quantizer is commonly modeled as a zero-mean white noise source, uncorrelated with the input, and of power spectral density (PSD)

$$P_{ww}(e^{j\omega}) = \frac{\Delta_S^2}{12},$$

where $$\Delta_s$$

denotes the quantizer step size.

For a flooring quantizer, w has a mean value of $$\frac{\Delta_S}{2}.$$

It follows that for the quantization node model of FIG. 8, the PSD of the coarse CORDIC quantization noise at the output is $$P_{nn}(e^{j\omega}) = \frac{\Delta_S^2}{12}|N(e^{j\omega})|^2.$$

In operation, the use of delta-sigma quantizer to reduce the granularity of the phase component produced by CORDIC 108 to convert the phase component to a coarse digital signal (four bits wide in the described embodiment) is significantly advantageous in that downstream demodulation processing blocks may be substantially simplified to handle much smaller data packages (4 bits instead of 10 bits, for example). One issue in providing such reduced processing, however, is to reduce adverse effects from quantization noise resulting from a potential loss of information when granularity of the data is reduced. The subsequent coarse phase component processing is operable to perform coarse phase component processing in a manner that substantially and adequately reduces adverse effects of the quantization by effectively pushing quantization noise out of band where it may be low pass filtered.

Figure 13:
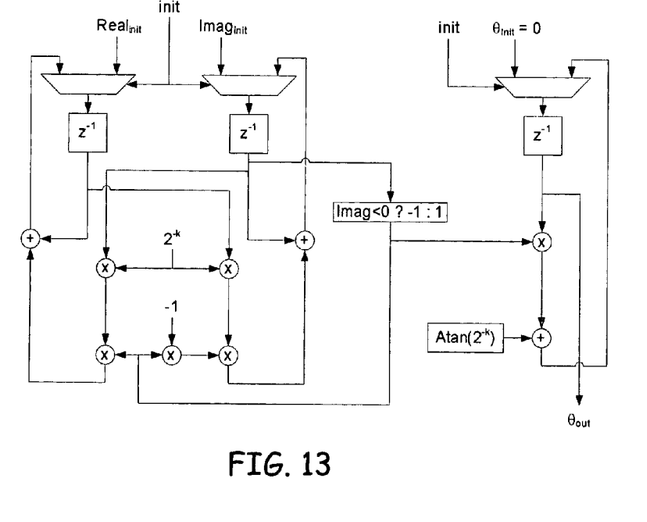
FIG. 13 is a schematic block diagram of an implementation of the CORDIC circuit for use in the radio processor according to one embodiment of the present invention.

FIG. 13 is an exemplary circuit block diagram of a CORDIC (also referenced herein as vector de-rotator) according to one embodiment of the present invention. In operation, the storage elements in FIG. 13 are initialized with the input vector and zero angle, and k is set to zero; on each of N subsequent iteration, k increments, and successively more accurate output angles are calculated until N iterations are complete. Note that all multiplies are trivial, as they are either sign changes or shift operations. Further, in the described embodiment of the invention, the "atan", or Arc Tan, operations are calculated a priori and stored in a simple look up table, indexed by k. As is known by those of average skill in the art, such a CORDIC may be implemented by Verilog code according to the design of FIG. 13. The algorithm shown works for input vectors in the $1^{st}$ and $4^{th}$ quadrant. Simple enhancements involving pre- and post-rotation are needed to handle the case of input vectors in the $2^{nd}$ or $3^{rd}$ quadrant. Pseudo code illustrating implementation of the CORDIC is as follows in Table A:

TABLE A

Pseudo code for a CORDIC

```
(Re, Im) = input vector;
theta = 0;
for (k=0..N) {
    mu = (Im < 0) ? -1 : 1;
    s = 2^-k;
    Re += mu * s * Im;
    Im += -mu * s * Re;
    theta += mu * atan(s);
}
return theta;
```

Referring back to FIG. 3, the coarse phase component 120 produced by vector de-rotator (CORDIC) 108 contains high pass filtered quantization noise that is based upon a precise digital phase value and is produced to differentiator 110. Differentiator 110 produces a differentiated output as a nine bit wide demodulated digital signal 122.

Figure 14:
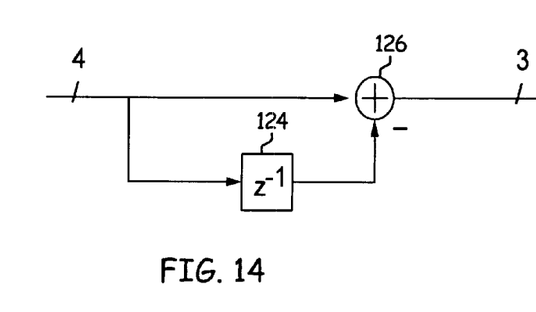
FIG. 14 is a functional block diagram of a differentiator as utilized in one embodiment of the invention.

FIG. 14 is a functional block diagram of a differentiator as utilized in one embodiment of the invention. As may be seen, a delay element 124 receives a 4 bit wide signal and sums each to a delayed bit to a preceding bit to create a 3 bit wide differentiated output from a summing element 126. The resolution of the output of the differentiator is 3 bits, i.e., is of the form fxp<3,2>, where two bits represent the integer portion and one bit represents the fractional portion of the output. This is less than the resolution of the input, namely 4 bits, fxp<4,3>, contradicting the observation that two 4-bit numbers are being added (subtracted) in the differentiator. To derive that 3 bits of resolution suffices to contain the differentiator output without further quantization, it should be observed that a modulation index (the maximum phase change per symbol in units of π) is 0.5 in GSM. Thus, with a normalized CORDIC angle output in the range [−4; +4], the maximum rate of phase change per symbol is $$\frac{d\Theta}{dt} \approx \frac{\pi \times 0.5 \times 4/\pi}{3.7us} = 0.54 us^{-1}$$

Given that the sampling rate of the differentiator is 3.25 MHz, this rate of phase change can easily be accommodated for in 3 bit numbers of the format fxp<3,2>, even in the presence of substantial high-frequency quantization noise.

Figure 15:
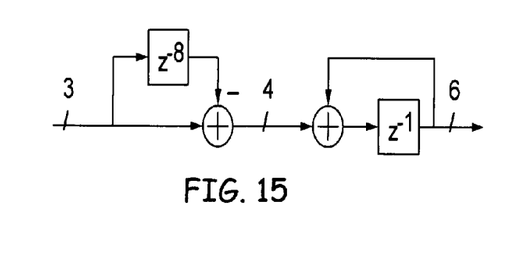
FIG. 15 is a functional block diagram of a smoothing filter according to one embodiment of the present invention.

FIG. 15 is a functional block diagram of a smoothing filter according to one embodiment of the present invention. While one of average skill in the art may readily implement a smoothing filter as shown, it should be pointed out that the smoothing filter of FIG. 15 is a low pass filter that filters out high frequency quantization noise components of the delta-sigma quantizer 84 of vector de-rotator 108. Thus, referring to FIG. 3 again, the smoothing filter 112 is connected to receive the demodulated digital signal 122 from differentiator 110 and is operable to apply a smoothing function to the differentiated signal 122 to produce a smoothed signal 128.

Figure 16:
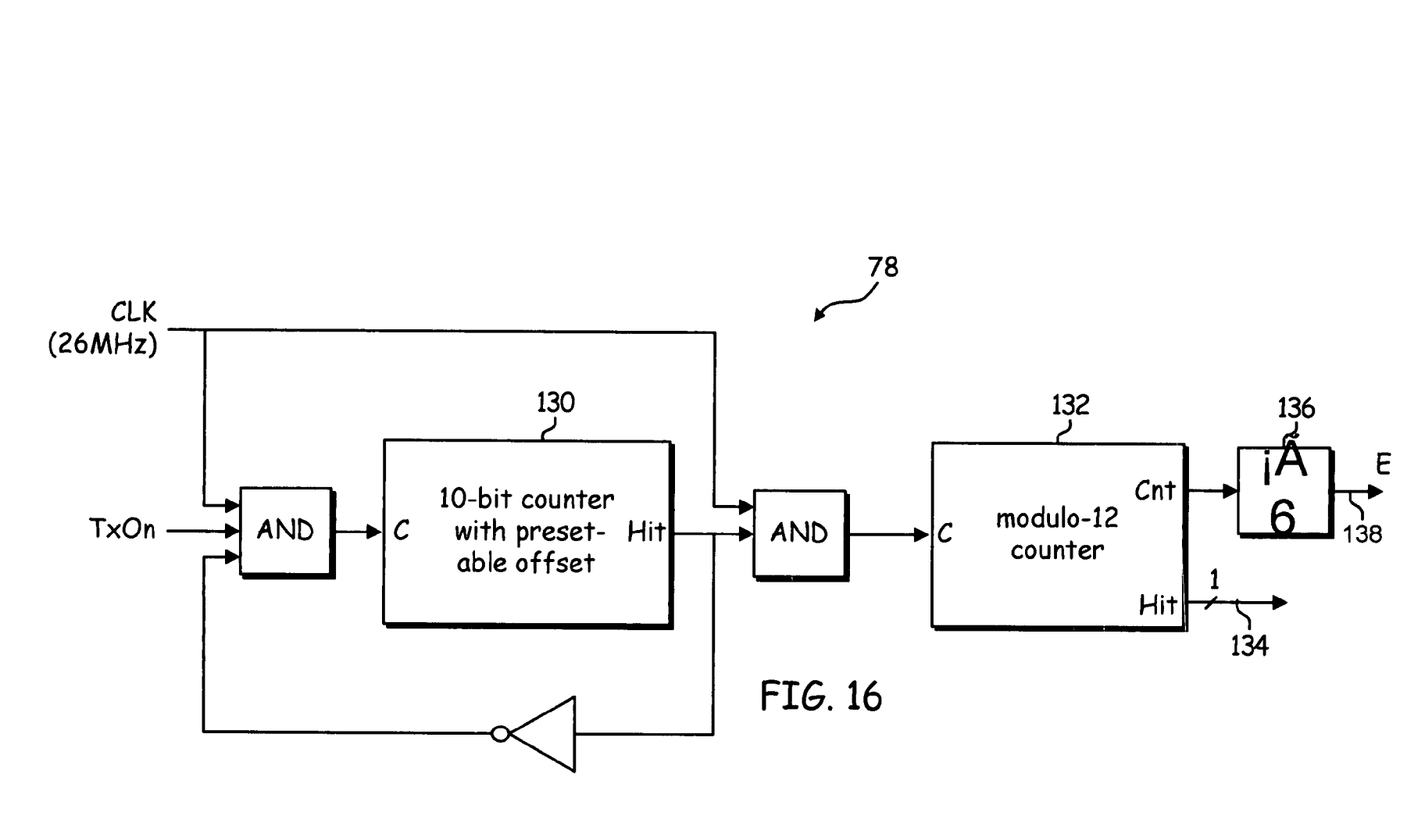
Fig. 16 is a schematic block diagram that illustrating an exemplary symbol timing Recovery circuit for use in the radio processer according to one embodiment of the present invention.

FIG. 16 is a schematic block diagram illustrating an exemplary symbol timing recovery circuit 78 for use in the radio processor according to one embodiment of the present invention. The symbol timing recovery circuit 78 includes a 10-bit counter 130 and a modulo-12 counter 132. The 10-bit counter 130 is programmed with a predetermined offset to synchronize the sampling of the demodulator output with the presence of valid data at the demodulator output. For example, when the control signal TxOn goes high, the 10-bit counter 130 is incremented with each clock pulse until the 10-bit counter 130 reaches the predetermined offset. When the 10-bit counter 130 overflows, the 10-bit counter 130 outputs a control signal to the modulo-12 counter 132. The modulo-12 counter 132 generates a read strobe signal 134 that is input to the digital processor to enable the digital processor to read the digital data bits in the output of the demodulator at optimal times corresponding to peak data values. As a result, the digital processor can be optimized to process the demodulated signal at optimal times of the slicer output. The modulo-12 counter 132 further generates a pulse for every count value to counter 136 which is operable to generate a control pulse "E" on output line 138 to trigger the sample and dump circuitry to dump the accumulated value and to reset itself to initiate and new accumulation. As shown herein, counter 134 is operable to generate the control pulse every time an accumulated value reaches or exceeds a specified value which, in the described embodiment, is equal to six.

Figure 17:
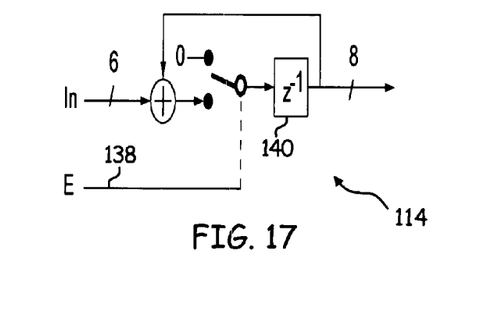
FIG. 17 is a functional block diagram that shows signal processing details of six-sample accumulate-and-dump circuit according to one embodiment of the invention.

FIG. 17 is a functional block diagram that shows signal processing details of six-sample accumulate-and-dump circuit according to one embodiment of the invention. Specifically, the six-sample accumulate-and-dump circuit is one that is appropriate for FIG. 3. The signal E received from line 138 is the enable signal as produced by the circuitry of FIG. 13. A delay element 140, in conjunction with the summing element of FIG. 17 is operable to accumulate a sequence of data bits as long as the enable signal is received and is operable to reset the accumulate and dump circuit when the enable bit is not received on line 138. While not shown, it is understood that the contents of delay element 140 are cleared once the enable signal on line 138 is not received (or changes logic state). In the described embodiment, the enable signal E is activated for 6 samples and the accumulator effectively generates the output of a length-6 running average filter. When E is de-activated, the register is reset. This digital filter of FIG. 17 provides the final amount of filtering of the high-frequency quantization noise prior to signal slicing.

Figure 18:
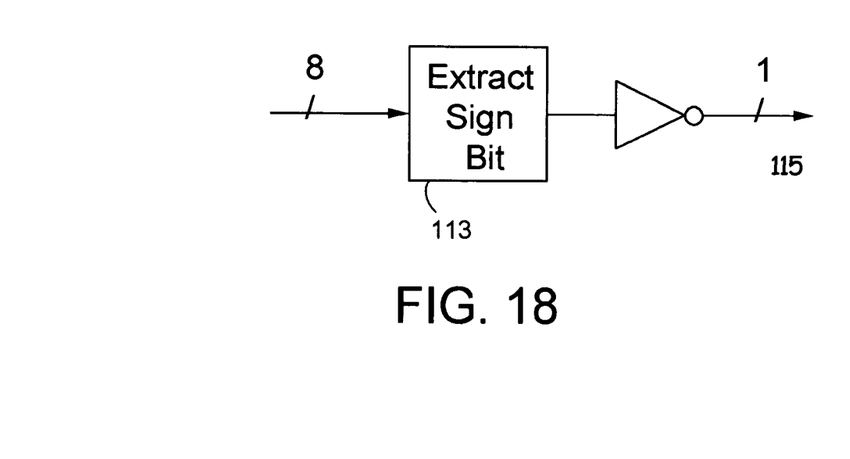
FIG. 18 is a functional schematic diagram of a slicer according to one embodiment of the invention.

Generally, the six-sample accumulator and dump circuit 114 (of FIG. 3, for example) is operable to accumulate and sum six consecutive samples of a bit stream and then to reset the accumulation process. An output of the six-sample accumulator thus emphasizes a logic value of a signal wherein a positive value typically represents a logic "1" and a negative value typically represents a logic "0". The accumulated output 150 of FIG. 3 then is produced to a slicer 116. FIG. 18 illustrates one example of a slicer 116 that is operable to extract a sign bit every eighth bit in a bit extractor 113 and to invert the extracted bit in an inverter 115 to produce a logic signal 152 representing a demodulated data bit.

Referring back to FIG. 3, the slicer 116 samples the accumulated output signal 150 and outputs the corresponding digital binary data 152 according to the value of the sign bit of the accumulate-and-hold output. The digital data bits 152 are input to a digital processor 76 to mitigate the effects of various imperfections in the radio processor circuitry, as is known in the art.

Continuing to FIG. 3, operation of the digital processor 76 is controlled by the timing recovery circuit 78. The timing recovery circuit 78 is connected to receive a control signal TxOn from the baseband processor. The control signal TxOn indicates the presence of valid data on the input signal lines (Tx_I and Tx_Q). When the control signal TxOn goes high, indicating the presence of valid data on the input signal lines, the timing recovery circuit 78 outputs a strobe signal 154 to activate the digital processor 76. The timing recovery circuit 78 is configured to delay the output of the strobe signal 154 by an amount of time necessary to synchronize the sampling of the digital data bits 152 by the digital processor 76 with the generation of data by the baseband processor. Thus, a fixed timing relationship exists between the presence of valid data in the input signal lines Tx_I and Tx_Q and the generation of the strobe signal 154 by the timing recovery circuit 78.

Figure 19:
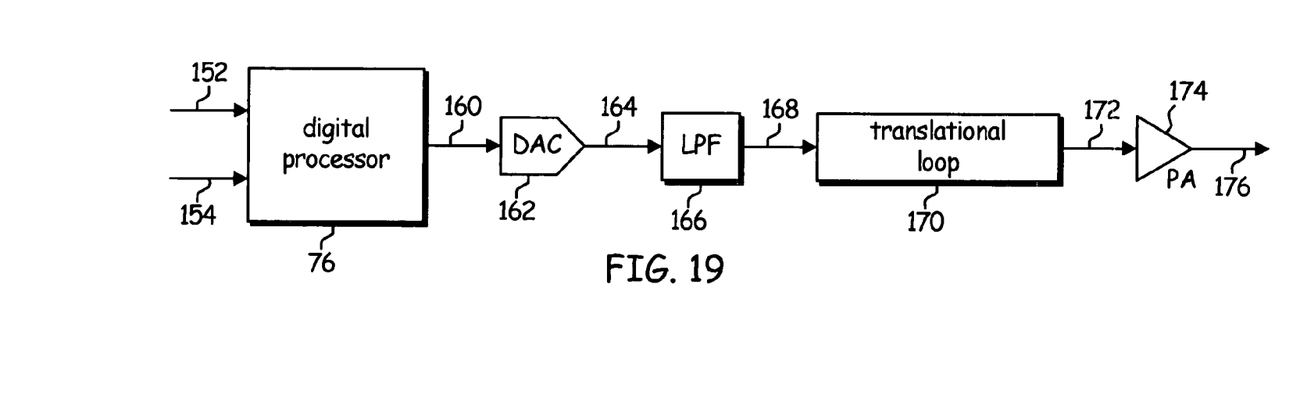
FIG. 19 is a circuit schematic diagram illustrating a digital processor and subsequent RF transmitter circuitry of a radio processor according to one embodiment of the present invention.

FIG. 19 is a circuit schematic diagram illustrating the digital processor 76 and subsequent RF transmitter circuitry of a radio processor 54 according to one embodiment of the present invention. The demodulated digital signal 152, including the digital data bits output from the slicer, are input to the digital processor 76, along with the strobe signal 152. The digital processor 76 processes the demodulated digital signal 152 to mitigate the effects of imperfections in the analog RF transmitter circuitry. The digital processor 76 further re-modulates the data in accordance with the particular wireless communication standard to produce a processed modulated digital signal. In one embodiment, the digital processor 76 processes the demodulated digital signal 152 at optimal times based on the receipt of the strobe signal 154. The output of the digital processor 76 is a digitized modulated low frequency signal. The digitized modulated low frequency signal 160 is converted by a DAC 162 to produce an analog modulated low frequency signal 164 and is low-pass filtered by an LPF 166 to create a continuous waveform low frequency signal 168. A translational loop 170 is then used to up-convert the continuous waveform low frequency signal 168 to a radio frequency signal 172 at the desired radio transmission frequency. The radio frequency (RF) signal 172 is amplified by a power amplifier 174, and the amplified RF signal 176 is transmitted over an antenna (not shown) to a targeted device, such as a base station, an access point and/or another wireless communication device.

Figure 20:
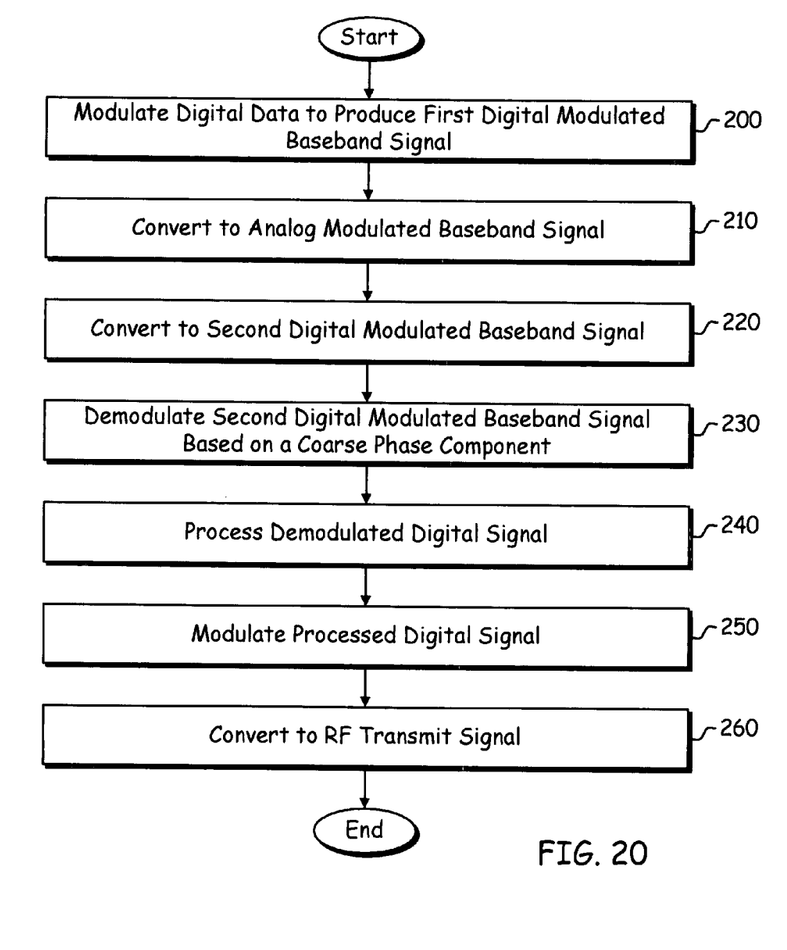
FIG. 20 is a flowchart illustrating a method of the present invention.

FIG. 20 is a flowchart illustrating one method of the present invention. A radio transmitter includes a baseband processor that modulates digital data to produce a first digital modulated baseband signal (step 200). The first digital modulated baseband signal is then converted to an analog modulated baseband signal and output to a radio processor (step 210). The radio processor converts the analog modulated baseband signal back into a second digital modulated baseband signal (step 220) and demodulates the second digital modulated baseband signal to produce a demodulated digital signal (step 230). Thereafter, the demodulated digital signal is processed to mitigate the effects of imperfections in the analog RF transmit circuitry (step 240) and re-modulated to produce a processed modulated digital signal (step 250). The demodulated signal is based upon a coarse phase component which is generated as described within this application wherein a phase component is extracted from the second digital modulated baseband signal and is coarsely quantized for demodulation processing. Finally, the processed modulated digital signal is converted to a Radio Frequency (RF) transmit signal by the RF transmit circuitry (step 260) for transmission via an antenna to a target device.

Figure 21:
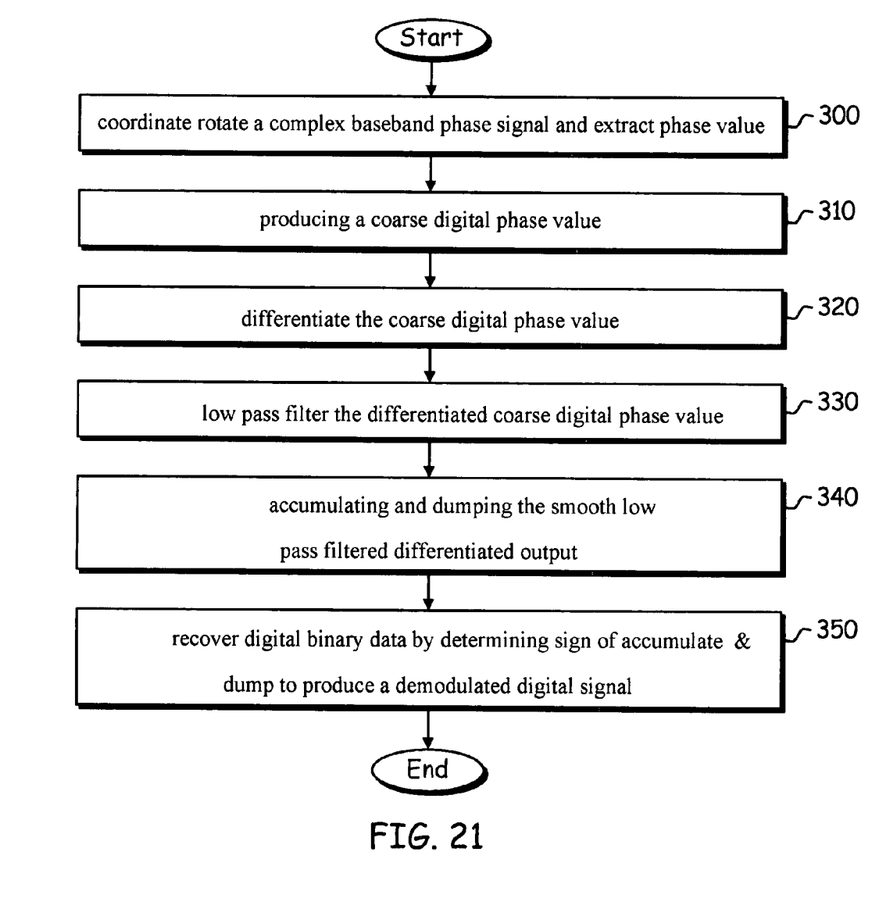
FIG. 21 is a flowchart illustrating a method of the present invention.

FIG. 21 is a flowchart illustrating a method for demodulating a signal according to one embodiment of the invention. The method of FIG. 20 initially comprises coordinate rotating a complex baseband phase signal to produce a phase component (step 300). The phase component is characterized by a precise digital phase value. Thereafter, the method includes producing a coarse digital phase value based upon the precise digital phase value (step 310) and differentiating the coarse digital phase value and producing a differentiated output comprising one of a positive or a negative indication of a rate of change of the coarse digital phase value (step 320). Thereafter, the method includes low pass filtering the differentiated output to produce a smooth low pass filtered differentiated output (step 330). The method then includes accumulating and dumping the smooth low pass filtered differentiated output and generating an output signal having a signed value representing one of a logic one and a logic zero (step 340). Finally, the method includes recovering digital binary data by determining the sign of the accumulate and dump function to produce a demodulated digital signal (step 350).

Generally, a radio processor is provided with a digital-to-analog converter to interface with baseband processors that produce analog complex modulated baseband signals and that converts the analog complex modulated baseband signal to a digital complex modulated baseband signal, and a demodulator that demodulates the digital complex modulated baseband signal to recreate the original transmit digital data as a demodulated digital signal. The demodulated digital signal is processed by a digital processor to mitigate the effects of various imperfections in the radio processor circuitry.

More specifically, in one embodiment, a digital-to-analog converter in the radio processor receives the analog complex Frequency Shift-Keyed (FSK) modulated baseband signal from the baseband processor and converts the analog complex modulated baseband signal to a digital complex modulated baseband signal. A demodulator is connected to receive the digital complex modulated baseband signal and demodulate the digital complex modulated baseband signal to produce a demodulated digital signal. The demodulated digital signal is input to a digital processor operable to process the demodulated digital signal and convert the demodulated digital signal to a digitized modulated signal. A digital-to-analog converter (DAC) converts the digitized modulated signal to a continuous waveform signal, and a filter filters the continuous waveform signal to produce a filtered signal. A translational loop converts the filtered signal to a radio frequency (RF) transmit signal for transmission by an antenna.

In one embodiment, the timing of the digital processor is optimized to enable the digital processor to optimally read the digital data from the demodulator using a timing recovery circuit. The timing recovery circuit receives a control signal from the baseband processor, and activates the digital processor based on a fixed timing relationship between receipt of the control signal at the timing recovery circuit and receipt of the analog modulated baseband signal at the demodulator. As yet a further aspect of the present invention, a delta-sigma quantizer is used to produce coarsely quantized phase data from finely quantized phase data to reduce processing circuitry. A combination of high pass filters and low pass filters appropriately implemented reduce the effect of quantization noise to provide accurate phase and data reconstruction.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A radio frequency (RF) transmitter, comprising:
 a baseband processor for digitally processing outgoing data, wherein the baseband processor is operable to produce an analog complex modulated baseband signal; and
 a radio processor, including:
  a complex analog-to-digital converter (ADC) connected to receive the analog complex modulated baseband signal, wherein the analog-to-digital converter is operable to convert the analog complex modulated baseband signal to a digital complex modulated baseband signal;
  a digital low pass filter coupled to receive the digital complex modulated baseband signal, the digital low pass filter for producing a low pass filtered outgoing digital signal;
  a demodulator connected to receive the digital complex modulated baseband signal, wherein the demodulator is operable to demodulate the low pass filtered outgoing digital signal to produce a demodulated digital signal, the demodulator further comprising:
   a CORDIC for producing a phase component based upon the digital complex modulated baseband signal, the phase component having a precise digital phase value; and
   a quantizer for producing a high pass filtered coarse digital phase value based upon the phase component having the precise digital phase value;
  a timing recovery circuit for generating timing signals for processing the demodulated digital signal;
  a digital processor connected to receive the demodulated digital signal, wherein the digital processor is operable to process the demodulated digital signal to produce a processed modulated digital signal;
  a digital-to-analog converter (DAC) connected to receive the processed modulated digital signal, wherein the DAC is operable to convert the processed modulated digital signal to a continuous waveform signal;
  an analog filter connected to receive the continuous waveform signal, wherein the filter is operable to produce a filtered signal, and
  a translational loop connected to receive the filtered signal, wherein the translational loop is operable to convert the filtered signal to a Radio Frequency (RF) transmit signal.

2. The RF transmitter of claim 1, wherein the analog complex modulated baseband signal includes an in-phase signal and a quadrature phase signal, and wherein the complex ADC includes:
 a first analog-to-digital converter (ADC) connected to receive the in-phase signal, wherein the first ADC is operable to convert the in-phase signal to a first digital signal; and
 a second ADC connected to receive the quadrature phase signal, wherein the second ADC is operable to convert the quadrature phase signal to a second digital signal.

3. The RF transmitter of claim 2, wherein the low pass filter further includes:
 a first low pass filter connected to receive the first digital signal, wherein the first low pass filter is operable to filter the first digital signal to produce a first filtered digital signal; and
 a second low pass filter connected to receive the second digital signal, wherein the second low pass filter is operable to filter the second digital signal to produce a second filtered digital signal.

4. The RF transmitter of claim 3, wherein at least one of the first low pass filter and the second low pass filter is a decimation filter operable to filter quantization noise and decrease a sample rate of a respective one of the first digital signal or the second digital signal.

5. The RF transmitter of claim 1 further including a differentiator coupled to receive the coarse digital phase value for producing a differentiated output comprising one of a positive or a negative indication of a rate of change of the coarse digital phase value.

6. The RF transmitter of claim 5 further including a smoothing filter for low pass filtering the differentiated output to produce a low pass filtered differentiated output.

7. The RF transmitter of claim 6 further including an accumulate-and-dump circuit for generating an output signal having a signed value representing one of a logic one and a logic zero.

8. The RF transmitter of claim 7 further including a slicer connected to receive the output signal and sample the output signal to produce digital data.

9. The RF transmitter of claim 8, wherein the timing recovery circuit is connected to receive a control signal, wherein the timing recovery circuit is operable to activate the digital processor based on a fixed timing relationship between receipt of the control signal at the timing recovery circuit and receipt of the analog complex modulated baseband signal at the demodulator, wherein an output of the timing recovery circuit enables the digital processor to read the digital data at a time corresponding to an optimal output of the slicer.

10. A radio transmitter, comprising:
baseband processor for generating outgoing analog baseband frequency signals;
analog-to-digital conversion circuitry for producing outgoing digital baseband signals based upon the outgoing analog baseband frequency signals;
low pass digital filtering circuitry for producing low pass filtered outgoing digital signals based on the outgoing digital baseband signals;
vector de-rotator for extracting and producing a precise phase component of the low pass filtered outgoing digital signals;
delta sigma quantizer for producing a coarse phase component based upon the precise phase component;
coarse phase component processing circuitry for producing digital data based on the coarse phase component;
timing recovery circuit for synchronizing sampling of the digital data;
digital processor for digitally processing the digital data and producing outgoing data signals; and
analog front end for converting the outgoing data signals to analog signals and for upconverting the analog signals to RF for transmission.

11. The radio transmitter of claim 10, wherein the analog complex modulated baseband signal includes an in-phase signal and a quadrature phase signal, and wherein the complex ADC includes:
a first analog-to-digital converter (ADC) connected to receive the in-phase signal, wherein the first ADC is operable to convert the in-phase signal to a first digital signal; and
a second ADC connected to receive the quadrature phase signal, wherein the second ADC is operable to convert the quadrature phase signal to a second digital signal.

12. The radio transmitter of claim 11, wherein the demodulator further includes:
a first low pass filter connected to receive the first digital signal, wherein the first low pass filter is operable to filter the first digital signal to produce a first filtered digital signal; and
a second low pass filter connected to receive the second digital signal, wherein the second low pass filter is operable to filter the second digital signal to produce a second filtered digital signal, and wherein at least one of the first low pass filter and the second low pass filter is a decimation filter operable to filter quantization noise and decrease a sample rate of a respective one of the first digital signal or the second digital signal.

13. The radio transmitter of claim 12, wherein the demodulator further includes:
a vector de-rotator connected to receive the first filtered digital signal and the second filtered digital signal, wherein the vector de-rotator is operable to the coarse phase component.

14. The radio transmitter of claim 13, wherein the demodulator further includes:
a differentiator connected to receive the coarse phase component, wherein the differentiator is operable to differentiate the coarse phase component to produce a differentiated digital signal that reflects one of a positive going or a negative going ramp which corresponds to a positive or a negative number respectively;
a smoothing filter connected to receive the differentiated digital signal, wherein the smoothing filter is operable to apply a smoothing function to the differentiated digital signal to produce a smoothed digital signal; and
a slicer connected to receive the smoothed digital signal, wherein the slicer is operable to sample the smoothed digital signal to produce digital data.

15. The radio transmitter of claim 14, wherein an output of the timing recovery circuit enables the digital processor to read the digital data at optimal times corresponding to an output of the slicer.

16. A method for digitally modulating a signal for transmission over an air interface, comprising the steps of:
modulating digital output data to produce a first digital complex modulated baseband signal;
converting the first digital complex modulated baseband signal to an analog complex modulated baseband signal;
converting the analog complex modulated baseband signal to a second digital complex modulated baseband signal;
demodulating the second digital complex modulated baseband signal to produce a demodulated digital signal which demodulated digital signal is based upon a coarse phase component, wherein demodulating the second digital complex modulated baseband signal further includes:
filtering the first digital signal to produce a first filtered digital signal;
filtering the second digital signal to produce a second filtered digital signal;
vector de-rotating the first filtered digital signal and the second filtered digital signal to produce a coarse phase component;
processing the coarse phase component to produce the demodulated digital signal;
applying a smoothing function to the demodulated digital signal to produce a smoothed digital signal; and
sampling the smoothed digital signal to produce digital data;
processing the demodulated digital signal to produce a processed modulated digital signal; and
converting the processed modulated digital signal to a Radio Frequency (RF) transmit signal.

17. The method of claim 16, wherein the analog complex modulated baseband signal includes an in-phase signal and a quadrature phase signal, and wherein the step of converting the analog complex modulated baseband signal to a second digital complex modulated baseband signal comprises the steps of:
converting the in-phase signal to a first digital signal by a first analog-to-digital converter (ADC); and
converting the quadrature phase signal to a second digital signal by a second ADC.

18. The method of claim 16, further comprising the step of:
activating the step of processing based on a fixed timing relationship between receipt of a control signal and receipt of the analog complex modulated baseband signal.

19. A method for demodulating a signal, comprising:
coordinate rotating a complex baseband phase signal to produce a phase component, the phase component characterized by a precise digital phase value;
producing a coarse digital phase value based upon the precise digital phase value;
differentiating the coarse digital phase value and producing a differentiated output comprising one of a positive or a negative indication of a rate of change of the coarse digital phase value;
low pass filtering the differentiated output to produce a smooth low pass filtered differentiated output;

accumulating and dumping the smooth low pass filtered differentiated output and generating an output signal having a signed value representing one of a logic one and a logic zero; and recovering timing of the output signal to produce timing signals for processing a demodulated digital signal.

* * * * *